Aug. 7, 1951     H. A. WILCOX ET AL     2,562,975
VIBRATION RESPONSIVE CONTROL
Filed Nov. 6, 1946     3 Sheets-Sheet 3
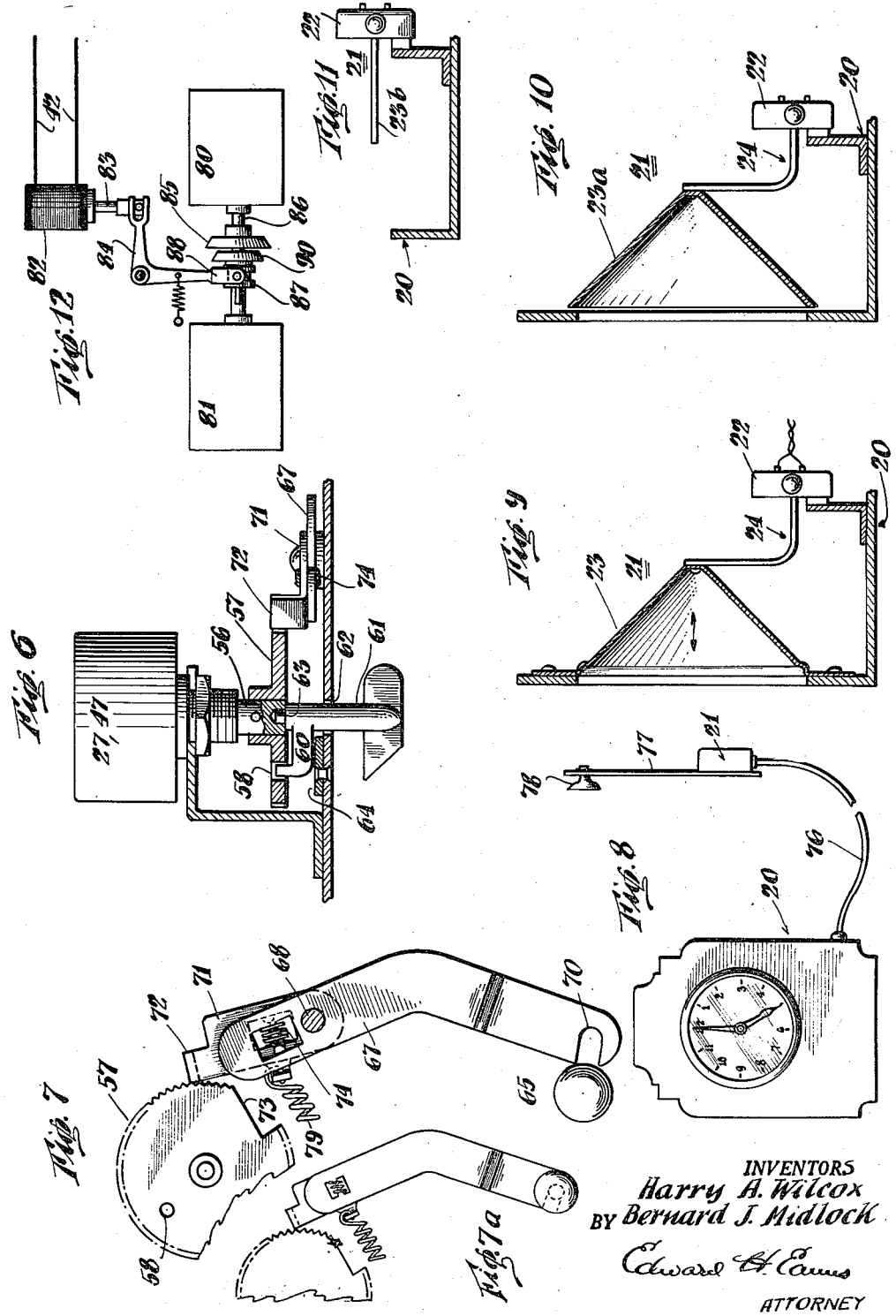
INVENTORS
*Harry A. Wilcox*
BY *Bernard J. Midlock*
*Edward H. Eames*
ATTORNEY Patented Aug. 7, 1951

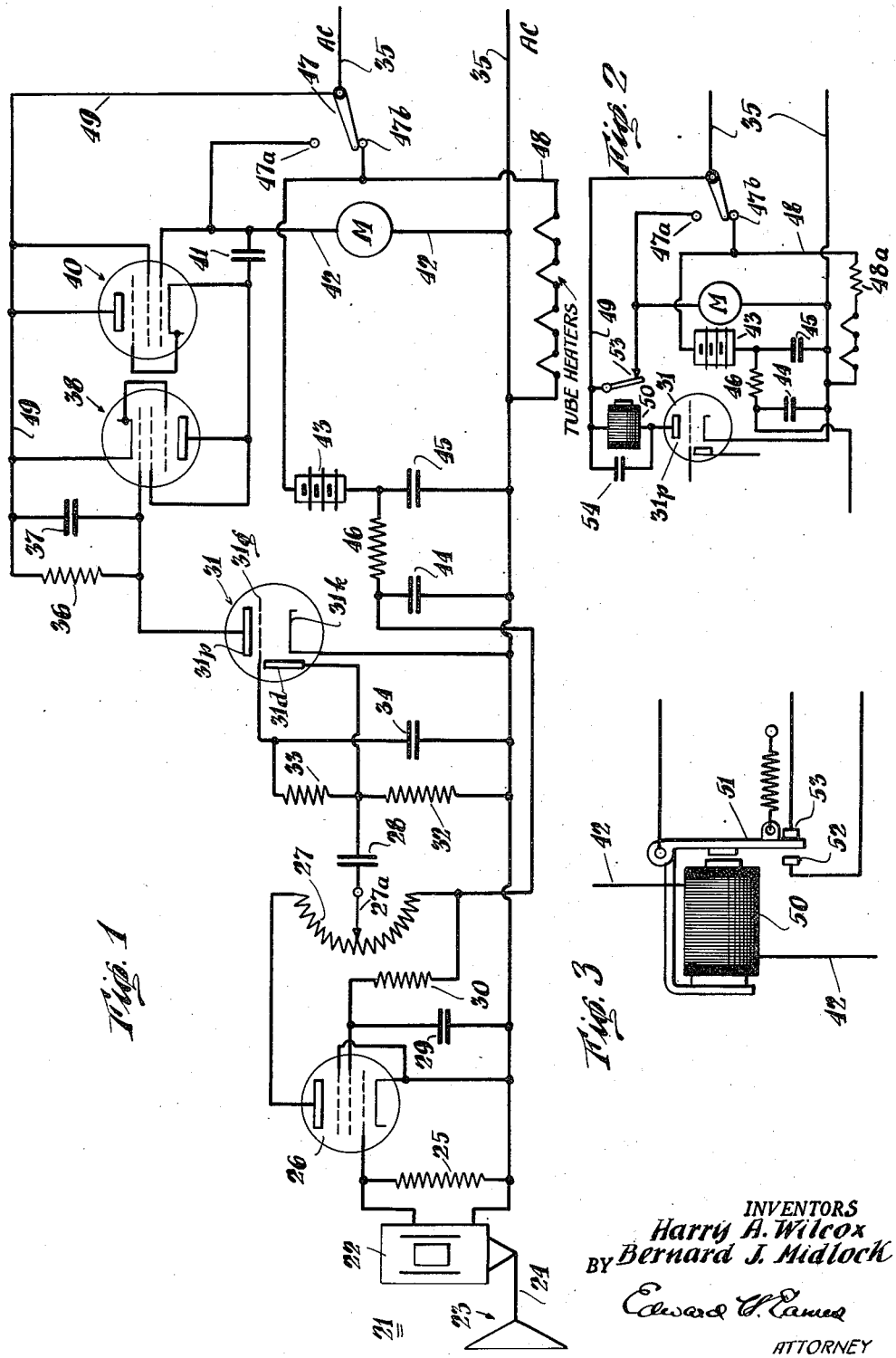

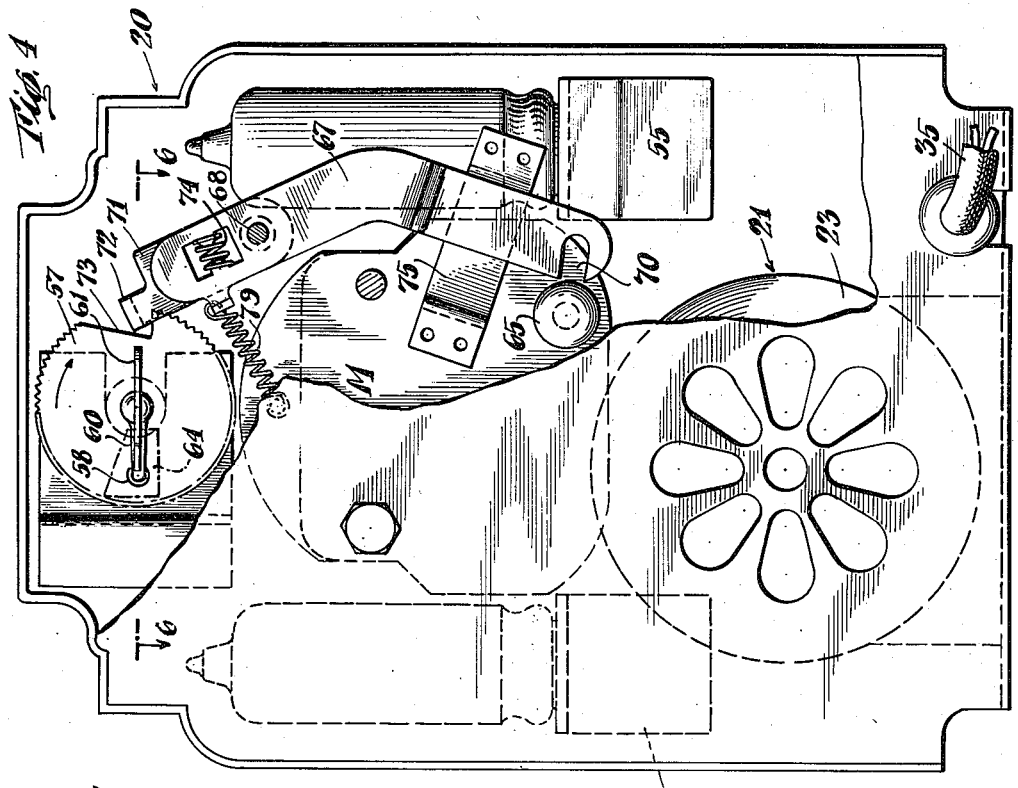

2,562,975

UNITED STATES PATENT OFFICE 2,562,975

VIBRATION RESPONSIVE CONTROL

Harry A. Wilcox and Bernard J. Midlock, Norwalk, Conn., assignors to Eastern Industries, Incorporated, East Norwalk, Conn., a corporation of Delaware Application November 6, 1946, Serial No. 708,202

19 Claims. (Cl. 161—15)

This invention relates to an improved apparatus for controlling the flow of electrical energy in response to the vibratory movement of an element of the apparatus.

It is an object of the invention to provide apparatus which will actuate an electric output device when the apparatus is subjected to vibrations emanating from an external source. Such vibrations may be sonic or supersonic, transmitted through air, vibrations of a purely mechanical nature as might occur in the operation of a machine and mechanically transmitted to the apparatus; or combinations of such airborne and mechanical vibrations.

It is another object of the invention to provide apparatus which will afford means by which one may determine the duration of vibrations emanating from an external source.

It is another and more specific object of the invention to provide means such as a timing device which will begin its operation coincident with the generation of vibrations received thereby and will cease operations when the vibrations have stopped.

It is an object of the invention to provide a registering apparatus such as a clock mechanism controlled to register an individual time interval or the aggregate elapsed time intervals during which either or both of the aforementioned categories of vibrations occur.

Another object of the invention is to provide a registering and control apparatus in which the registering mechanism may be reset after the completion of a registering function, and having means whereby the register may not be tampered with or reset by an unauthorized person.

Still another object of the invention is to provide a control apparatus which will be responsive primarily to vibrations of a substantially predetermined minimum intensity and which may be adjusted primarily only by authorized persons to respond to a different minimum intensity.

It is still another object of the invention to provide a device embodying an electric clock which may optionally be used as a conventional clock or as a device for timing the duration of vibrations within a relatively broad frequency range and in which, therefore, the electric clock will operate only during the periods in which such vibrations occur.

It is a further object of the invention to provide a vibration responsive timing apparatus for obtaining the cumulative elapsed time of one or more periods of relatively sustained but not necessarily continuous vibrations, whereby the apparatus will not start timing upon the occurrence of any individual noise or other relatively short isolated train of vibrations but once started the apparatus will not discontinue timing upon the occurrence of momentary silence or relatively short intervals of absence of vibrations such as occur from time to time during singing, or making an oratorical address or playing a composition on a musical instrument.

Although as appears from the foregoing objects the invention has a rather wide field of application, a typical use would be for recording or indicating the playing time of a musical composition or the delivery time of an oration or other vocal delivery, whereby the apparatus would remain in operation only so long as the sound wave vibrations were being received by the vibration responsive element. For example, a music student may wish accurately to time his practice period. So long as he is actively engaged in practicing, the timing mechanism will be operating; during resting periods or other substantial intervals of silence, the timing mechanism will stop and will not recommence operation until its vibration-sensitive element again receives sonic vibrations.

Other features and advantages will hereinafter be described.

In the accompanying drawings:

Fig. 1 is a typical circuit diagram illustrating one preferred embodiment of the vibration-responsive control;

Fig. 2 is a partial circuit diagram showing an alternative circuit arrangement for the part of the vibration-responsive control circuit of Fig. 1 to the right of tube 31.

Fig. 3 illustrates a specific form of electrical output or work device, to wit, a relay to be energized or deenergized according to the presence or absence of vibrations;

Fig. 4 is a rear elevation of one embodiment of the invention, the rear cover plate being partially broken away to reveal underlying structure;

Fig. 5 is a side elevation of the apparatus of Fig. 4, certain elements being shown in section;

Fig. 6 is a top plan view, partly in section, showing the key for sensitivity adjustment of the apparatus for vibration intensity and for switching on and off the vibration responsive control;

Fig. 7 is a somewhat schematic elevation, showing operation of a protective feature preventing jamming of the timer reset locking means if the key is turned while the reset knob is depressed for resetting;

Fig. 7a is an elevation similar to Fig. 7 but showing normal locking operation of the timer reset locking means.

Fig. 8 is a front elevation of a second embodiment of the invention, in which the vibration-responsive element is remote from the control apparatus;

Fig. 9 and Fig. 10 are alternative methods of mounting the vibration-responsive cone for use in timing sonic or other air-borne vibrations;

Fig. 11 is an embodiment of the invention useful in recording or indicating the duration of mechanically-transmitted vibrations; and Fig. 12 is a somewhat schematic representation of an electric output device for operating a clutch by means of which a continually operating device, such as a clock, may be drivingly connected to a register which is to operate only during the periods of received vibrations.

According to one aspect, the present invention aims primarily to provide a control apparatus by means of which the energization or deenergization of a circiut or circuits may be governed responsive to sound or mechanical vibrations transmitted through the air or other medium. In a preferred embodiment, the circuits to be thus energized and deenergized may govern the operation of a self-starting synchronous electric clock or like timing device by means of which the duration of individual sequences of vibrations or the aggregate elapsed time intervals of such sequences may be timed.

Accordingly the apparatus 20, Figs. 4 and 5, includes an electric clock C of any conventional type, the self starting synchronous motor M of which is to be energized during the time intervals in which the vibration responsive means 21 receives vibrations from an external source.

Referring to Figs. 9 and 10 for example said vibration responsive means or transducer 21 includes a crystal cartridge 22 suitably secured to the casing or framework of the apparatus. The crystal cartridge is advantageously of the type conventionally used in phonographic play-back equipment. As is commonly known, such cartridges embody piezo-electric crystals in which electric charges are generated when the crystals are subjected to mechanical strain, such as torsional strains. For response to airborne sonic vibrations there may be utilized a preferably conic diaphragm 23 or 23a (shown in section in Figs. 9 and 10) to the apex of which is attached an arm 24 which transmits the diaphragm vibrations to the crystal cartridge. The opposite end of the arm 24 is engaged by the usual needle chuck of such crystal cartridge all as schematically shown in the embodiment in Fig. 9. It is of course desirable that the conic diaphragm and arm be light in weight to reduce the inertia thereof. Paper, or thin aluminum sheet, is suitable for the diaphragm; and the arm 24 has satisfactorily been formed as an aluminum stamping so arranged as to be rigid in the direction of motion. It is understood that the diaphragm is disposed adjacent to suitable openings provided in the rear wall of the casing. Fig. 9 illustrates a diaphragm of embossed paper, stiffened cloth, aluminum foil or other material of equivalent lightness and stiffness, suitably secured about its periphery to the rear wall of the casing to permit axial movement and supported at its apex on arm 24. In Fig. 10, the diaphragm 23a is free at its periphery and is supported only at its apex on arm 24.

In Fig. 11, the transducer 21 is arranged for response primarily to mechanical—as differentiated from air-borne—vibrations, and in lieu of a cone, there is employed an inertia bar 23b which will transmit to the crystal cartridge 22 the vibrations experienced by the case as the latter rests upon a vibrating structure.

In the vibration responsive control circuit shown in Fig. 1, the suitably loaded output of the transducer 21 is connected to the signal grid of high gain pentode voltage amplifier tube 26 such as a conventional 12BA6 tube. Resistor 25 serves as the load for the output of the transducer 21.

Resistance 27 provided with a variable arm 27a serves both as the plate load of voltage amplifier 26 and as an adjustable sensitivity control. Resistor 30 is the usual means employed to obtain the proper D. C. operating potential for the screen grid of tube 26 and is associated with capacitor 29 to reduce the degeneration effect of the screen grid circuit on the amplified audio voltage output of tube 26 across control resistance 27. Capacitor 28 serves as D. C. isolation and coupling between control resistance 27 and the paralleled plates 31d (shown as one plate) of the dual diode hi mu triode tube 31, with resistor 32 as the diode load resistance.

Ressitor 33 and capacitor 34, connected in the grid circuit of the triode section of tube 31, make up a grid filter network and D. C. grid return thru resistors 33 and 32 to cathode of tube 31. The triode section of tube 31 is operated as a grid controlled rectifier with resistor 36 as plate load and capacitor 37 connected across 36 as 60 cycle filter.

Tubes 38 and 40 in Fig. 1 are preferably power amplifier type tubes and may be of the 50B5 type, beam power amplifiers, operated with screen grids tied to the plates, for triode operation. Resistor 36 is the D. C. grid return path to cathode for tube 38. The cathode of tube 38 and the anode of tube 40 are connected via lead 49 to the upper power lead 35. The anode of tube 38 and the cathode of tube 40 are connected together to one side of capacitor 41, the other side of capacitor 41 being connected to the control grid of tube 40, and to one side of clock motor M, the other side of motor M being connected to the lower power lead 35. Capacitor 41 connected in the control grid-cathode circuit of tube 40, Fig. 1, forms the self-biasing source for tube 40. With switch 47 in lower position 47b the vibration responsive control circuit is energized at the tube heaters via lead 48 and at rectifier 43 for rectification of the A. C. line voltage for D. C. voltage supply for the anode and screen of amplifier tube 26 as will be further described below. Thus tubes 38 and 40 connected as in Fig. 1 in series with capacitor 41, leads 42 and clock motor M provide a grid controlled power circuit for obtaining full wave operation of the clock motor M, which is preferably of the ordinary low power self-starting synchronous type, across power source 35, which may be 115 volt 60 cycles for example.

Rectification of the line voltage is accomplished by means of a dry disc rectifier 43, the input side of which is connected to lead 48 and lower switch terminal 47b. A thermionic or gaseous rectifier suitably connected may be used in place of dry disc rectifier 43. Capacitors 44, 45 and resistor 46 provide conventional D. C. filtering to filter the plate supply for the amplifier tube. The heaters of all tubes are connected in series via lead 48 across the A. C. line through switch 47 at lower switch contact 47b, the heater of tube 26 being connected at the end of the series heater string nearest the cathode of tube 26. This will serve to minimize the hum pickup of the cathode circuit of this tube from the heater circuit. A single pole double throw switch 47 is provided in the power circuit 35. This affords the option of disconnecting the power circuit 35 from the vibration responsive circuit at 47b when this circuit is not desired and connecting the clock motor M to the power circuit 35 at 47a to operate the clock continuously as a conventional time piece, thus providing alternative twofold use of the clock. The switch is advantageously combined in the same housing as resistor 27, as later explained.

With switch 47 in lower contact 47b position shown in Fig. 1, power from source 35 is applied via contact 47b to the tube heater circuit 48 and rectifier 43, and since power is permanently connected from upper power lead 35 at the right hand pivoted end of switch arm 47 to the plate and screen of tube 40, cathode of tube 38 and through resistor 36 to plate 31p of tube 31, the vibration responsive control circuit is fully energized in this position of the switch.

In the nonoperating condition of the clock motor M when no vibrations are being applied to transducer 21 or when low intensity vibrations are received and sensitivity control 27 is set for clock operation on high intensity vibrations only, the triode section of tube 31, operating with substantially zero bias on its signal grid, rectifies the A. C. line voltage and approximately 50 volts D. C. appears across load resistor 36 and filter capacitor 37. Since resistor capacitor network 36 and 37 is also in the grid circuit of the tube 38 the resulting 50 volt D. C.-negative at the grid and positive at the cathode of 38, will keep tube 38 in cutoff condition. With tube 38 in cut-off condition tube 40 will conduct through the clock motor, providing half-wave rectification of the A. C. line voltage to provide pulsating D. C., only to an extent necessary to quickly charge up series capacitor 41 to a negative bias voltage approximating cut-off bias for tube 40 since the signal grid of tube 40 is returned to the negatively charged side of capacitor 41. The current required to keep capacitor 41 charged is negligible and is not sufficient to operate the clock motor M.

Considering now the condition of vibrations being received of sufficient intensity to operate the vibration responsive circuit to cause operation of the clock motor, referring to Fig. 1, the vibration responsive control circuit is energized through switch 47—47b from power source 35 as previously mentioned. Vibrations picked up by the transducer 21 are translated into an alternating votage which is amplified by voltage amplifier tube 26. The amplified version of the transducer output voltage across the control resistance 27 is applied through the adjustable control arm, through capacitor 28 to the half wave signal rectifier circuit, resistor 32 and diode plate 31d, which dissipates the positive half of the alternating signal voltage. The resulting negative pulsating D. C. voltage from the signal voltage across load resistor 32 is applied as negative bias signal voltage through resistor 33 to grid 31g of the tube 31.

Capacitor 34 in conjunction with resistor 33 forms a filter network to smooth out the applied negative pulsating signal to a substantially steady D. C. bias voltage. Thus the amplitude of this D. C. negative bias voltage at the grid 31g is higher with more intense vibrations than with lower intensity vibrations applied to the transducer 21. Likewise the setting of the arm of sensitivity control 27 determines the amplitude of the signal voltage applied to the plate 31d and resistor 32, resulting in a higher amplitude of bias at 31g for a higher setting (by clockwise rotation) of arm of control resistance 27 for a given intensity of vibrations picked up by transducer 21.

It is noted then that this aforementioned negative D. C. signal bias on grid 31g exists so long as vibrations of sufficient amplitude are picked up by transducer 21 and this bias will vary in degree with the changes in amplitude of the sound vibrations. In the circuit of Fig. 1 a relatively small such bias is sufficient to substantially cut off current flow in triode section of tube 31, thereby reducing the D. C. rectified voltage across 36 and 37 to zero, unblocking anode-cathode circuit conduction in tube 38 by reducing its grid bias substantially to zero. Thus tube 38, as a result of the vibrations picked up by the transducer 21, will conduct on one half of the A. C. line voltage through the clock motor, series capacitor 41 and lead 49 across line 35.

It is noted here that the aforementioned steady state charge in capacitor 41, which has served as the self bias voltage of tube 40 in the condition of absence of vibrations, will now be cancelled or removed by allowing this charge to pass off through motor M and tube 38 when the anode-cathode circuit of tube 38 becomes substantially conducting in the condition of receipt of vibrations. Tube 40 will then conduct on the second half of the line voltage cycle through clock motor M, capacitor 41 and power switch 47, and since tube 38 will conduct on the first half of the line voltage cycle the clock motor will receive substantially full wave A. C. line voltage.

Clock motor M, which is of the self-starting synchronous type, will operate as long as vibrations are picked up by transducer 21. The clock motor M will start operating when the bias voltage across 36 and 37 has been reduced approximately to 20% for example due to the vibrations being picked up, and it is a characteristic of such a motor that the motor, once started, will continue to operate as a synchronous motor until approximately 75% of the bias is restored due to a reduction in the intensity of the vibrations. Thus moderate fluctuations in the intensity of vibrations picked up by the transducer will not cause error in timing of the duration of the vibrations.

It may be desirable to introduce a time lag in starting and stopping of the motor. Such time lag may be incorporated in the grid circuit of tube 31. Increasing the resistance of resistor 32 or 33 or capacitance of capacitor 34 beyond the ordinary values appropriate for load and filtering action will increase the time which elapses between a vibration response of the transducer 21 and the starting of motor M and between the stopping of vibrations and the stopping of motor M. Such time lag has value in maintaining operation of the clock motor during momentary interruptions of vibrations such as occur from time to time in playing a musical instrument or in recitation of an oratorical address.

Fig. 3 is a schematic representation of a relay coil 50 for connection to the control circuit at the leads 42 in lieu of the clock motor M wherever the apparatus is to be used to control the operation of other than clock or timing devices or where it is desired to have the clock operated through such a relay. If for example it is desired to have the clock start and stop at more nearly the same vibration level than in the circuit of Fig.

1, relay coil 50 may be connected in series with lead 42 in place of clock M and clock M then connected across power leads 35 in series with contact 51—52 of relay 50. The relay armature 51 is illustrated as cooperating with the contact 52 to close an electrical circuit only during the stage of energization of relay 50, which will, of course, occur only when the transducer 21 is receiving vibrations where relay 50 is connected to leads 42. Obviously a back contact 53 may be used alternatively to open a circuit where the specialized circuit conditions require.

If relay 50 is of the sensitive type with sufficiently low power requirement to be operated directly by the output of tube 31 the relay coil 50 may be connected in parallel with a capacitor 54, as shown in Fig. 2, between plate 31p and lead 49; and resistor 36, capacitor 37, tubes 38 and 40, capacitor 41 of Fig. 1 may then be omitted as shown in Fig. 2. The back contact 53 of the relay will then serve to control the clock M in this alternative form of the apparatus as indicated in Fig. 2, the clock being operated by deenergization of relay 50 as the plate current of tube 31 is reduced by grid bias developed by vibrations received.

In this alternative form of the circuit in Fig. 2 a resistor 48a is included in the heater circuit 48 in place of the heaters of tubes 38 and 40 of Fig. 1 to maintain proper heater voltage for the remaining tubes 26 and 31. In this alternative arrangement relay 50 would be energized, in absence of vibrations, by the half cycle plate current of tube 31 and sustained by capacitor 54 in the remaining half cycle of the line voltage.

Examining the mechanical construction of the apparatus as shown in Figs. 4 and 5, it is seen that the electrical constituents may be conveniently grouped about the clock motor M by providing brackets or shelves 55 on the rear or closure wall of the casing to support the tube sockets and the like. The resistors and capacitors (not shown in Figs. 4 or 5) may be arranged within the casing about the microphone assembly.

As previously stated, the control resistor 27 and switch 47 may be combined in a common housing (see Figs. 5 and 6). Full counterclockwise rotation of control shaft 56 will place arm of switch 47 in contact with terminal 47a, and will place arm 27a at the lower end of resistor 27. In this position 47a the switch 47 connects the clock M thru leads 42 directly to power circuit 35 for conventional clock operation.

Control resistor 27 is so connected in the circuit as to get the lowest signal voltage transfer to resistor 32 and tube 31 thru capacitor 28 with arms 27a in full down position. Clockwise rotation (commencing at the aforesaid conventional clock operating position) will first move the arm of switch 47 from position 47a to position 47b, energizing the vibration responsive control circuit (see Fig. 1), whereby the clock will operate only during vibration periods. Continued clockwise rotation regulates the value of resistor 27 to determine the sensitivity of response to vibrations, the sensitivity increasing with clockwise rotation.

Referring to Figs. 4, 5 and 6, affixed to the shaft 56 of the resistor-switch combination 27, 47 there is a knurled disc 57 having a notch providing a cam surface 73 and also having a hole 58 to receive a finger 60 provided on a switch key 61, said key being insertable in a vertical keyhole opening or key slot 62 in the rear plate of the casing. The knurling is not essential but is preferably provided to give some degree of friction in rotation of disc 57 against lug 72 of lever arm 71 so that the disc will remain where it is placed by rotation of key 61.

The inner end 63 of the switch key inserts into a socket in the end of shaft 56, to provide a pivot point for said key 61 for locating and engaging hole 58 in disc 57 with finger of arm 60 (see Figs. 5 and 6) for rotation of the disc 57 by the key. The inner end of key 61, including its finger arm 60, has been broken away in Fig. 5 to show the underlying lug 72 of lever arm 71. Spring 79, which is shown in Fig. 4, has not been shown in Fig. 5 in order to permit the side details of the locking lever combination 67—71 to be seen more clearly.

In full counterclockwise rotation of switch key 61 and disc 57 with switch 47 in position 47a, a lug 64 affixed to the back plate of the case frictionally engages finger of arm 60 of key 61, and effectively secures the key against removal, see Figs. 4 and 6, without shifting the disc clockwise, thus providing a means of safekeeping for the key 61 when the apparatus is operated as a conventional continuously operating clock. Clockwise rotation of key 61 from the aforesaid conventional clock operating position, moves arm of switch 47 to energize control circuit as previously described thus permitting finger of arm 60 of key 61 to clear lug 64 enabling key 61 to disengage disc 57, see Fig. 5. Key 61 is removed thru slot 62 in back plate when it is desired to prevent further adjustment of sensitivity through control resistance 27 or to prevent switching to conventional operation of the clock.

Means are provided for resetting the clock and securing the resetting means against operation when the clock is connected to the vibration responsive control circuit. A resetting device is conventional and includes a knob 65 on a shaft 66. Normally the knob 65 is in the Fig. 5 position, and in order to reset the clock it is necessary to push the knob inwardly and turn it. A lock-lever 67 is pivoted to the back plate of the case at 68. One end of said lever has a slot 70 suitable to embrace the shaft 66 when the lever is rotated clockwise about its pivot. Cooperating with the opposite end of the lever and pivoted on the pivot 68 is an arm 71 having an inwardly turned lug 72 for cooperation with a sloping cam 73 formed as a notch in the disc 57. The respective members 71 and 67 are mechanically associated by means of a coil spring 74 the ends of which engage lugs respectively provided in the overlapping portions of the arms 67 and 71 as most clearly appears in Fig. 7.

When the switch key is in the conventional continuous clock operating position shown in Fig. 4, the cam notch registers with the finger 72, whereupon a spring 79 urges the lock-lever 67 counterclockwise to position its notch 70 remote from the knob 65, permitting reset of the clock. However, when the disc 57 is turned clockwise from its Fig. 4 position, to its vibration responsive clock control position as shown in Fig. 7a, with knob 65 released the angular cam 73 causes a clockwise rotation of the lever 67, whereby the notch 70 embraces the setting shaft 66, positioning the end of the lever behind the knob 65, making it impossible to push the knob inwardly to set the clock. A strap 75 which overlies the arm 67 secures said arm against being forced inwardly.

As shown in Fig. 7 the two part structure of the lock lever combination 67—71 affords means of guarding the lever or other portions of the device against damage if, after the setting knob 65 has been pushed inwardly so that its body is in the path of rotation of lever 67, the disc 57 is turned clockwise so that the cam surface 73 would urge the lever 67 into clockwise rotation.

The spring 74 permits the arm 71 to turn on the pivot 68 as shown in Fig. 7 without imposing any damaging strain on lever 67 or other parts of the apparatus. This permits the lever 67 to remove to its normal locking position of Fig. 7a as soon as knob 65 is released to its normal outer position with disc 57 remaining in its Figs. 7–7a position.

In the embodiment of Fig. 8 the apparatus 20 is similar in all respects to that previously described except that the transducer unit 21 is remote from the case and serves the circuit by means of a flexible lead 76. The transducer unit may be mounted on any suitable support such as the strap 77, said strap being provided with a hook, or means such as the suction cup 78, for supporting the transducer unit on or in contact with the source of vibration.

Fig. 12 somewhat schematically shows a magnetically operated clutch pursuant to which a time registry mechanism 80 may be mechanically connected to a continuously operating clock mechanism 81 during periods when it is desired to register the duration of vibrations. A solenoid 82, the leads 42 of which are to be inserted in the electrical circuit as is shown for the leads 42 of the motor M in Fig. 1, has a plunger 83 connected with a pivoted bell crank lever 84. One member of a cone clutch 85 is affixed to the shaft 86 of the register 80. A clutch sleeve 87 operatively associated with a fork 88 on bell crank 84 carries a cooperating clutch disc 90. When the solenoid 82 is energized, the bell crank 84 is rotated counterclockwise about its pivot to effect the mechanical engagement of the clutch elements and thereby to drive the register 80 from the clock 81. When the vibrations cease, a declutching action occurs, thereby insuring that the register indicates only the time duration of the vibrations.

The range of frequencies of vibrations to which the apparatus responds to operate a timer or other work device is determined by selection of the type of microphone or other form of transducer and types of tubes 26 and 31 as well as value of resistance and capacitance of the several resistors and capacitors, and the apparatus may be thus arranged for operation in the sonic or audio range or in the sub-sonic or supersonic frequency ranges as desired and the sensitivity of the apparatus in picking up vibrations to operate the work device can be increased if desired by employing further amplification by means of one or more additional amplifier tubes and suitable coupling, all as will be understood by those skilled in the art.

It will be understood that the complete device will ordinarily be connected to the usual A. C. power supply through the commonly used two wire electric cord and plug, the latter being plugged into the familiar convenience power outlet so that the device can be disconnected entirely by removing the plug from the outlet, but where it is desired to have a permanently wired device an ordinary switch may be interposed in one or both of the leads 35 if desired for the purpose of connecting or disconnecting the device from the power supply. It will also be obvious to those skilled in the art that the connection from the upper contact 47a of switch 47 may be omitted in the circuit of Fig. 1 to provide an "off" position if optional conventional clock operation is not desired, or that an intermediate position for switch 47 may be provided between contact 47a and 47b as an "off" position in the Fig. 1 circuit, so that the clock or timer as well as the vibration responsive control is disconnected and inactive with the switch in such "off" position if desired.

It will be appreciated that any ordinary self-starting electric timer of the indicating type may be used in place of electric clock M to indicate elapsed time in minutes or in hours and fractions of hours or other units of time as desired and that the elapsed time indicated may thus exceed the twelve hour total of the usual clock and extend for much longer periods if desired. The time indication may also be in the form of a register indicating a direct count of units of time as desired instead of in the form of the usual clock hands. Preferably all forms of time indication would be resettable by authorized persons as desired.

In one or more of its several forms as a vibration responsive timer the apparatus of the invention may serve to time shorthand transcribing of dictation in stenographic training and testing, particularly where the dictation is in intermittent sequences and it is desired to record the cumulative time of the actual dictation sequences. Also the apparatus may serve in the cumulative timing of sound or other vibrations arising from or indicating operation of industrial processes or equipment or laboratory equipment for example especially where it is desired to avoid direct electrical connection or in some cases to avoid direct mechanical connection with such equipment.

An advantage of the circuit of Fig. 1 appears in certain applications of the apparatus in that the switching on and off of the timer by the vibration responsive circuit is accomplished electronically and therefore silently and without any making or breaking of electrical contacts. Thus for example the apparatus, once having been connected for vibration responsive operation, may be employed for silent timing of vibrations from equipment or industrial processes involving the presence of inflammable gases or explosive atmospheres or where any appreciable sound from operation of any ordinary relay in the vibration responsive apparatus might interfere with the equipment or processes being tested.

The following representative values for resistance and capacitance have been found suitable for one practical embodiment of the invention along the lines of the circuit of Fig. 1, for response to sonic vibrations, employing the electronic tubes previously described and a conic paper diaphragm and a sensitive phonograph type piezoelectric crystal cartridge with a rated output of 3 volts on 1000 C. P. S. as a phonograph pickup.

Resistor 25 may be of 10 megohms, capacitor 29 of 0.2 microfarad, and resistor 30 of 1 megohm. Adjustable resistor 27 may have a total resistance of 300,000 ohms and capacitor 28 may be of .01 microfarad. Resistor 32 may be of 8 megohms and resistor 33 of 2 megohms. Capacitor 34 may be of .05 microfarad. Resistor 36 may be of 200,000 ohms and capacitor 37 of .05 microfarad. Capacitors 41 and 45 may each be of 12 microfarads and capacitor 44 of 0.2 microfarad. Resistor 46 may be of 100,000 ohms.

Although the invention has been described by making a fully detailed reference to the certain presently preferred embodiments, such detail of description is to be understood in an instructive rather than a limiting sense, many changes in addition to those described being possible within the scope of the claims hereto appended.

We claim:

1. Apparatus for indicating the duration of a vibrating condition, comprising a transducer responsive to mechanical vibrations impinging thereon to generate an electric current; means for amplifying said generated current; an electrically driven timing device; an alternating current power source for said timing device; a pair of mutually interconnected thermionic tubes connected into said power source to provide a grid-controlled electrical full-wave power circuit to operate said timing device; and an electrical circuit between said amplifier and said thermionic tubes to control the grid-bias values of said tubes to operate said timing device in response to such current and as long as such current is so generated by such vibrations.

2. Apparatus for indicating the duration of a vibratory condition, comprising a transducer responsive to mechanical vibrations impinging thereon to generate an electric current; a timing device including a synchronous motor; an alternating current power source for said motor; a pair of mutually interconnected grid controlled thermionic tubes each operable to transmit one half of the alternating current wave and collectively operating under grid control to transmit full wave power to said motor; and an electric circuit from said transducer to said thermionic tubes to bias the grids thereof to pass full-wave current only upon generation of a predetermined voltage output from said transducer.

3. Timing apparatus responsive to vibrations from an external source, comprising a transducer for converting vibrations impinging thereon into electrical energy; means for amplifying and rectifying said energy; an electric timing device operable only by full-wave alternating current; an alternating current power source for said device; and control means in said power source, comprising a pair of grid-controlled thermionic tubes each operable to transmit one half wave current and collectively operating to transmit full wave current to said timing device; an electric circuit means connecting said amplifier and rectifying means to one of said tubes for biasing said tube substantially to cut-off condition in absence of substantial amplified and rectified electrical energy; a capacitor connected to have a substantially predetermined state of charge maintained by the second of said tubes during the cut-off condition of the first tube to bias said second tube substantially to cut-off condition; and means responsive to substantial such amplified and rectified electrical energy generated by said transducer for reducing the bias voltage at the first of said tubes to bring the tube to operating condition to conduct on one half of the alternating voltage cycle; and circuit means interconnecting the plate of said tube with said capacitor to change from such predetermined state the charge of said capacitor to reduce the bias imposed thereby on the second of said tubes to cause said second tube to conduct on the other half of said cycle.

4. Apparatus according to claim 3, in which said timing device includes a self-starting, synchronous motor.

5. Apparatus according to claim 3, in which said timing device includes a solenoid-actuated mechanical clutch.

6. In combination with an electric clock of the self-starting, synchronous motor type, a transducer operable to convert mechanical vibrations impinging thereon into electrical energy; a source of alternating current voltage for said motor; thermionic switch means in said current source for transmitting full-wave current to said motor only when vibrations are impinging upon said transducer; manually operable switch means for disconnecting said motor from said thermionic switch means and connecting said motor to said power source for continuous operation of said clock motor; means for manually setting said clock; and locking means rendering said setting means inoperable during the operation of said motor under control of said thermionic switching means.

7. In combination with an electric clock of the self-starting, synchronous motor type, a transducer operable to convert mechanical vibrations impinging thereon into electrical energy; a source of alternating current voltage for said motor; thermionic switch means in said current source for transmitting full-wave current to said motor only when vibrations are impinging upon said transducer; manually operable switch means for disconnecting said motor from said thermionic switch means and connecting said motor to said power source for continuous operation of said clock motor; means for manually setting said clock; and a lever mechanically movable by said manually operated switch for rendering said setting means inoperable during the operation of said motor under control of said thermionic switching means.

8. A vibration controlled timing apparatus including in combination, an indicating electric timer, a transducer for translating vibrations into electrical energy variations, an electronic circuit including means responsive to such variations and connected between said transducer and said timer to operate said timer responsive to such variations resulting from vibrations translated by said transducer and to stop said timer responsive to termination of such variations upon termination of such vibrations, and means forming a part of said apparatus to provide a time lag between translation of such vibrations and such operation of said timer responsive thereto whereby said timer will be started responsive only to relatively sustained vibrations and will be stopped after an appreciable period of absence of vibrations, but will continue to operate through momentary interruptions of vibrations.

9. The combination of a timing device including a synchronous motor, means including a pair of mutually interconnected thermionic tubes each operable to transmit one half of an alternating current wave and collectively operable for connection to an alternating current power source under grid control to transmit full wave power to said motor, and a grid control circuit for switching said tubes to and from a substantially conducting basis for such power transmission to such motor to start and stop said timing device.

10. Timing apparatus including an electric timing device operable only by full wave alternating current, a pair of thermionic tubes each operable to transmit one half of an alternating current wave and collectively operating under grid control to transmit full wave current to said timing device, an electric circuit connected to one of said tubes for normally biasing said tube substantially to cut-off condition, a capacitor connected to have a substantially predetermined state of charge maintained by the second of said tubes during the cut-off condition, circuit means for controlling the grid bias of the first tube between cut-off and operating conditions for one half wave, and circuit means interconnecting the plate of said first tube with said capacitor to change to and from such predetermined state the charge of said capacitor according to cut-off and operating grid bias of the first tube respectively to control the grid-bias fo the second tube for cut-off and operating conditions respectively for the other half wave.

11. In combination, an electric clock of the self-starting synchronous motor type, a transducer operable to convert mechanical vibrations impinging thereon into electrical energy, a source of alternating current for said motor, switch means for connecting said source to said motor, and thermionic control means for said switch means for operating said switch means to connect said motor to said source only responsive to and so long as vibrations are impinging upon said transducer.

12. In an apparatus for indicating the cumulative time duration of a series of variably spaced trains of oscillatory vibrations comprising an alternating current electric timer, a transducer for mechanical to electrical oscillations and an electrical control circuit for operating said timer only in response to such electrical oscillations; said circuit including means for amplifying and rectifying said electrical oscillations, a pair of grid controlled thermionic tubes each operable to transmit half wave current and connected together to transmit full-wave alternating current to said timer in response to grid bias control, means connecting the output of said amplifying and rectifying means to one of said tubes for biasing said tube substantially to cut-off condition in absence of such electrical oscillations, a capacitor connected to have a substantially predetermined state of charge maintained by the second of said tubes during the cut-off condition of the first tube to bias said second tube substantially to cut-off condition, and means responsive to substantial such amplified and rectified electrical energy for reducing the bias voltage at the first of said tubes to bring the tube to operating condition to conduct on one half of an alternating voltage cycle, and means interconnecting the plate of said tube with said capacitor to change from such predetermined state the charge of said capacitor to reduce the bias imposed thereby on the second of said tubes to cause said second tube to conduct on the other half of said cycle.

13. In an apparatus for indicating the cumulative time duration of a series of substantially spaced sound trains as in a practice timer, a portable unitary structure including a casing, an indicating electric timer in said casing, a transducer for sound to electric wave energy mounted in said casing, said casing providing an aperture to permit external sound to actuate said transducer, an operating circuit for said timer and an electronic switching circuit in said operating circut and connected between said transducer and said timer in said casing for silently closing and opening the operating circuit to said timer in response to increase and decrease of such electrical energy respectively at the beginning and ending of said sound trains respectively, whereby said timer will be operated substantially only for the duration of such sound trains.

14. An apparatus as in claim 13, and including a manual resetting device for said timer, selective means for placing said apparatus alternatively into and out of sound responsive operation, and interlocking means between said selector means and said resetting device to prevent resetting of said timer when said apparatus is in sound responsive operation.

15. An apparatus as in claim 13, and including a manual resetting device for said timer, a key removable from said casing, a selector device operated by said key in said casing for placing said apparatus into and out of sound responsive operation as desired, and an interlocking device between said selector device and said resetting device to prevent resetting of said timer when said apparatus is in such sound responsive operation.

16. An apparatus as in claim 13, and including a sensitivity control in said casing for adjusting the sound intensity for which said electronic switch will operate said timer, and a removable key for setting said sensitivity control only when inserted in said casing.

17. An apparatus as in claim 13, and including a sensitivity control in said casing for adjusting the sound intensity for which said electronic switch will operate said timer, and a removable key for setting said sensitivity control only when inserted in said casing, means interlocking said sensitivity control and key and resetting device to prevent resetting said timer except when said key is in said casing and said sensitivity control is set for said apparatus to be substantially out of sound responsive operation.

18. An apparatus as in claim 13, and including a circuit including an electric energy storage element connected with said electronic switching circuit for providing a time-lag between the beginning and end of any sound train and the consequent starting and stopping of operation of said timer respectively to sustain operation of said timer during momentary interruptions of sound as within any of the substantially spaced sound trains.

19. In an apparatus for indicating the cumulative time duration of a series of substantially spaced sound trains as in a practice timer, a portable unitary structure including a casing, a self-starting synchronous electric clock in said casing, a transducer for sound to electric wave energy mounted in said casing, said casing provided with an aperture to permit external sound to actuate said transducer, an operating circuit for said clock and an electronic switching circuit in said operating circuit and connected between said transducer and said clock in said casing for silently closing and opening the operating circuit to said clock in response to increase and decrease of such electrical energy respectively at the beginning and ending of said sound trains respectively, whereby said clock will be operated substantially only for the duration of such sound trains.

HARRY A. WILCOX.
BERNARD J. MIDLOCK.

REFERENCES CITED

The following references are of record in the file of this patent:

UNITED STATES PATENTS

| Number | Name | Date |
| --- | --- | --- |
| 2,216,730 | Berger | Oct. 8, 1940 |